US012594780B2

(12) United States Patent
Humenick et al.

(10) Patent No.: US 12,594,780 B2
(45) Date of Patent: Apr. 7, 2026

(54) SYSTEMS AND METHODS FOR APPLYING A POSITIVE PRESSURE WITHIN A DYE SUBLIMATION MACHINE

(71) Applicant: Sekisui Kydex, LLC, Bloomsburg, PA (US)

(72) Inventors: Jeffrey Humenick, Bloomsburg, PA (US); Jym Kauffman, Bloomsburg, PA (US); Rebecca Gallup, Bloomsburg, PA (US)

(73) Assignee: Sekisui Kydex, LLC, Bloomsburg, PA (US)

( * ) Notice: Subject to any disclaimer, the term of this patent is extended or adjusted under 35 U.S.C. 154(b) by 775 days.

(21) Appl. No.: 17/874,686

(22) Filed: Jul. 27, 2022

(65) Prior Publication Data

US 2023/0039544 A1 Feb. 9, 2023

Related U.S. Application Data

(60) Provisional application No. 63/229,981, filed on Aug. 5, 2021.

(51) Int. Cl.
*B41M 5/035* (2006.01)
*B41F 16/00* (2006.01)
(Continued)

(52) U.S. Cl.
CPC ....... *B41M 5/0358* (2013.01); *B41F 16/0046* (2013.01); *B41F 16/006* (2013.01);
(Continued)

(58) Field of Classification Search
CPC .. B41M 5/0358; B41M 5/03; B41M 5/38221; B41J 2/475
See application file for complete search history.

(56) References Cited

U.S. PATENT DOCUMENTS 5,641,372 A * 6/1997 Okuno .................. B41F 17/006 156/286
5,644,351 A 7/1997 Matsumoto et al.
(Continued)

FOREIGN PATENT DOCUMENTS

CA 2039054 A1 10/1991
JP 3628937 B2 3/2005
(Continued)

OTHER PUBLICATIONS

International Search Report and Written Opinion on PCT Appl. PCT/US2022/038163 dated Oct. 26, 2022 (13 pages).
(Continued)

*Primary Examiner* — Henok D Legesse
(74) *Attorney, Agent, or Firm* — Foley & Lardner LLP

(57) ABSTRACT

An illustrative dye sublimation apparatus may comprise a pressure housing in the heating component. The pressure housing may apply a positive pressure on a membrane covering a combination of a printed sheet and a substrate. The positive pressure applied by the pressure housing may cause the printed sheet and substrate to snugly press against each other throughout a heating cycle. Furthermore, the positive pressure applied by the pressure housing may be even or approximately even throughout an upper surface of the membrane. The dye sublimation apparatus may utilize the pressure housing in addition or as an alternative to a negative pressure applied by a vacuum pump.

13 Claims, 6 Drawing Sheets

(51) Int. Cl.

| | |
|---|---|
| ***B41F 33/16*** | (2006.01) |
| ***B41J 2/475*** | (2006.01) |
| ***B41M 5/03*** | (2006.01) |
| *B41M 5/382* | (2006.01) |

(52) U.S. Cl.

CPC .......... *B41F 16/0066* (2013.01); *B41F 33/16* (2013.01); *B41J 2/475* (2013.01); *B41M 5/03* (2013.01); *B41M 5/38221* (2013.01)

(56) References Cited

U.S. PATENT DOCUMENTS

| | | | | |
|---|---|---|---|---|
| 8,308,891 | B2 | 11/2012 | Drake et al. | |
| 8,450,655 | B2 | 5/2013 | Chao et al. | |
| 8,609,583 | B2 | 12/2013 | Hoggard | |
| 2005/0248649 | A1* | 11/2005 | Farrell .................... | D06P 5/004 347/216 |
| 2011/0229664 | A1 | 9/2011 | Hoggard | |
| 2012/0196085 | A1 | 8/2012 | Langan et al. | |
| 2015/0029289 | A1 | 1/2015 | Rosner et al. | |

FOREIGN PATENT DOCUMENTS

| | | | |
|---|---|---|---|
| JP | 2007-261602 | A | 10/2007 |
| WO | WO-2020/162958 | A1 | 8/2020 |

OTHER PUBLICATIONS

International Preliminary Report on Patentability for US App. PCT/US2022/038163 dated Feb. 6, 2024 (7 pages).

EPO Extended European Search Report for Application No. 22853707.2 mailing date May 21, 2025, 9 pages.

* cited by examiner

600

SYSTEMS AND METHODS FOR APPLYING A POSITIVE PRESSURE WITHIN A DYE SUBLIMATION MACHINE

CROSS-REFERENCE TO RELATED APPLICATIONS

This application claims the benefit of and priority to U.S. Provisional Application 63/229,981, filed Aug. 5, 2021, the entire disclosure of which is incorporated by reference herein.

TECHNICAL FIELD

This application is directed generally towards a dye sublimation apparatus (also referred to as a dye sublimation machine) and more specifically towards systems and methods for applying a positive pressure within a heating section of the dye sublimation apparatus.

BACKGROUND

Dye sublimation is a process of infusing images to a substrate. An image to be infused is printed on a paper (or other type of sheet) using sublimation dyes (contained in the sublimation inks) and the printed paper is pressed against a substrate under heat. The heat causes the dyes to sublimate from a solid state on the printed paper to a gaseous state to travel to the substrate, where the dyes are deposited as solids. This sublimation process therefore infuses the image in the printed paper into the substrate. As the infused image is embedded within the substrate, the image may not chip, fade, or delaminate like capped and printed images.

A dye sublimation apparatus may have a heating section to generate the heat for sublimating the dyes such that the dyes can travel from the printed paper (or printed sheet) to the substrate. Within the heating section, a membrane may be used to snugly press the printed sheet against the substrate. For example, FIG. 1 shows a conventional heating section 100 of a conventional dye sublimation apparatus. As shown, within the heating section 100, there may be a printed sheet 108 pressed against a substrate 104, the combination of the printed sheet 108 and the substrate 104 being on a bed 102. A membrane 106 may enclose the combination of the printed sheet 108 and the substrate 104. To hold the printed sheet 108 in place pressed against the substrate 104, a vacuum pull 110 may be applied.

However, the aforementioned conventional technique of holding the printed sheet 108 against the substrate 104 by using the vacuum pull 110 has several technical shortcomings. For example, the vacuum pull 110 may cause the edges of the membrane 106 to seal prior to the center thereby causing air pockets towards the center of the membrane 106. More generally, the vacuum pull 110 may not be uniform or even throughout the surface of the printed sheet 108. Furthermore, the vacuum pull 110 may not create a consistent contact between the printed sheet 108 and the substrate 104. The inconsistency in the contact may be caused by the uneven pressure within the membrane 106 as a consequence of the uneven vacuum pull 110.

As such, a significant improvement upon generating pressure within the dye sublimation apparatus is desired.

SUMMARY

What is therefore desired are dye sublimation systems and methods that may generate an even and consistent pressure throughout a printed sheet and substrate combination. What is further desired are dye sublimation systems and methods that may provide an even and consistent pressure on the printed sheet and substrate combination throughout the heating cycle.

Embodiments described herein attempt to solve the aforementioned technical problems and may provide other benefits as well. An illustrative dye sublimation apparatus may comprise a pressure housing (also referred to as a pressure box or pressure enclosure) in a heating component. The pressure housing may apply a positive pressure on a membrane covering a combination of a printed sheet and a substrate. The positive pressure applied by the pressure housing may cause the printed sheet and substrate to snugly press against each other throughout a heating cycle. Furthermore, the positive pressure applied by the pressure housing may be even or approximately even throughout an upper surface of the membrane. The dye sublimation apparatus may utilize the pressure housing in addition or as an alternative to a negative pressure applied by a vacuum pump.

In one embodiment, a dye sublimation apparatus for infusing an image on a printed sheet to a substrate comprises at least one heater configured to heat the printed sheet to sublimate one or more dyes forming the image, such that the one or more dyes travel to the substrate in a gaseous state and deposit on the substrate in a solid state to infuse the image into the substrate; a membrane configured to cover the printed sheet and the substrate; and a pressure housing configured to apply a positive pressure to the membrane such that the printed sheet and the substrate press against each other throughout a heating cycle.

In another embodiment, a dye sublimation method for infusing an image on a printed sheet to a substrate comprises heating, by at least one heater of a dye sublimation apparatus, the printed sheet to sublimate one or more dyes forming the image such that the one or more dyes travel to the substrate in a gaseous state and deposit on the substrate in a solid state to infuse the image into the substrate; applying, by a pressure housing of the dye sublimation apparatus, a positive pressure to a membrane configured to cover the printed sheet and the substrate, such that the printed sheet and the substrate press against each other throughout a heating cycle; and regulating, by a processor of the dye sublimation apparatus, the positive pressure applied by the pressure housing.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1:
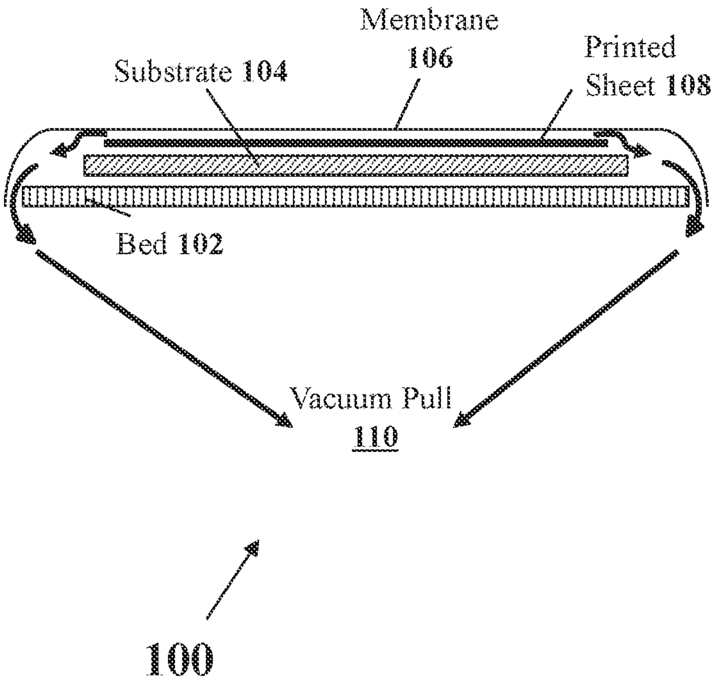
FIG. 1 PRIOR ART
FIG. 1 shows a heating section of a conventional dye sublimation apparatus.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein describe improved dye sublimation systems and methods that allow for an even and consistent contact between a printed sheet and a substrate throughout a heating cycle. Compared to the conventional dye sublimation apparatuses that rely solely upon a negative pressure generated by a vacuum pump, improved dye sublimation systems and methods can utilize a configurable pressure housing to generate a positive pressure such that the printed sheet and the substrate more uniformly press against each other throughout the heating cycle.

The pressure housing is configured to generate positive pressure. The pressure housing may be controlled by a processor (microprocessors and/or controllers). In an example, movement of fluids (e.g., gas, liquid) into the pressure housing generates the positive pressure. Fluid moving into the pressure housing can increase the pressure inside the pressure housing thereby increasing the downward force imparted by the pressure housing. In addition or in the alternative, at least a bottom portion of the pressure may be elastic (e.g., formed elastic materials such as rubber) such that the movement of the fluid into the pressure housing causes the bottom portion to expand. Such expansion exerts a downward force thereby generating the positive pressure. In case of a gaseous fluid, the gaseous fluid may be compressed with the processor controlling the flow of compressed gaseous fluid into the pressure housing.

In an embodiment, the pressure housing may generate the pressure using mechanical actuators. For example, an illustrative dye sublimation apparatus includes one or more motors controlled by the processor. In addition to moving the pressure housing, the one or more motors may cause the pressure housing to press downward thereby generating a positive pressure. In another embodiment, the pressure housing generates the positive pressure through a chemical process. It should be understood that these are just a few examples to generate the positive pressure that should not be considered limiting. Other mechanisms (including fluid movement), electrical, electromechanical, and/or chemical mechanism or process to generate the positive pressure should be considered within the scope of this disclosure.

Figure 2:
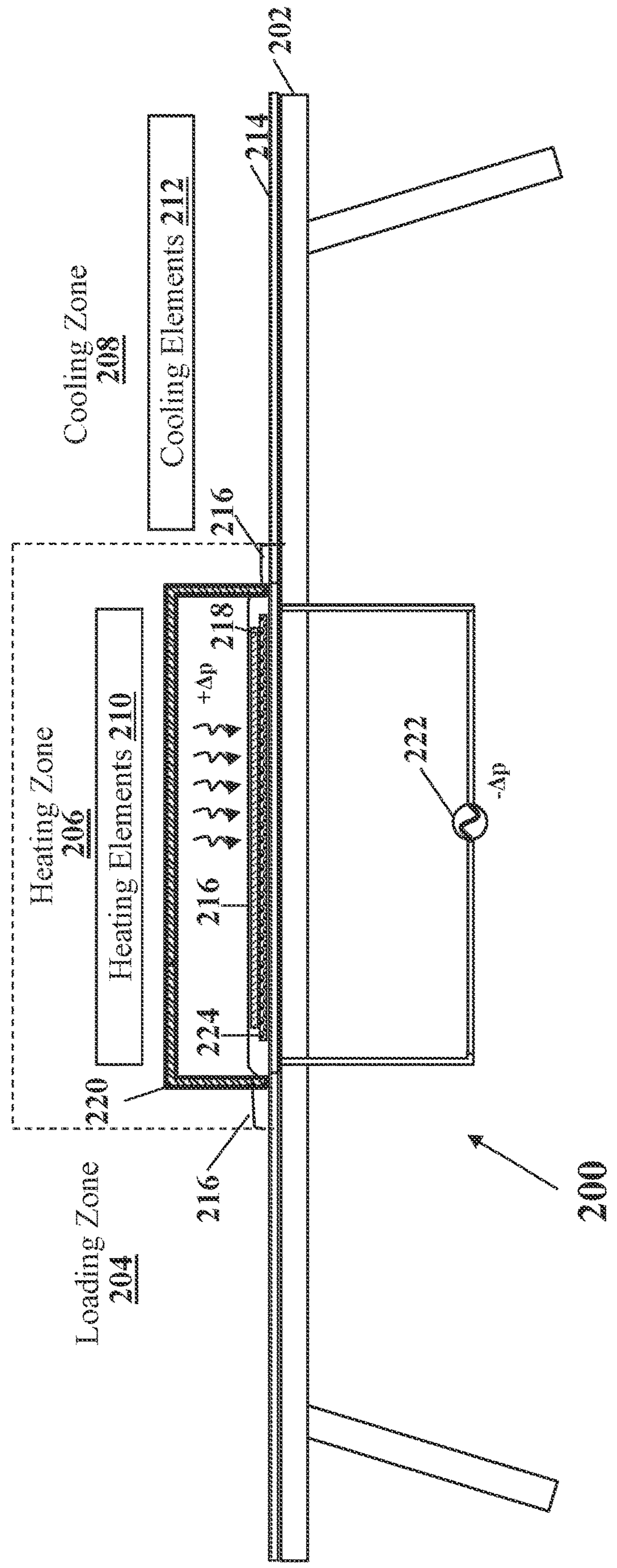
FIG. 2 shows a dye sublimation apparatus, according to an embodiment.

FIG. 2 shows an illustrative dye sublimation machine (also referred to as dye sublimation apparatus) 200, according to an embodiment. It should be understood that the dye sublimation machine 200 shown in FIG. 2 and described herein is merely for illustration and explanation and machines with other form factors and components should also be considered within the scope of this disclosure. For example, dye sublimation machines having additional, alternative, or a fewer number of components than the illustrative dye sublimation machine 200 should be included within the scope of this disclosure.

The dye sublimation machine 200 may comprise a sublimation table 202, which may provide structural support for the components of the dye sublimation machine 200. The dye sublimation machine 200 in general and the sublimation table 202 in particular may be divided into three zones: a loading zone (also referred to as a loading section or loading component) 204, a heating zone (also referred to as a heating section or heating component) 206, and a cooling zone (also referred to as a cooling section or cooling component) 208. The loading zone 204 may allow a worker (or a user) to load a printed sheet 218 and a substrate 224. The printed sheet 218 may have an image printed thereon using sublimation inks containing sublimation dyes. The substrate 224 may be of any type of material, such as thermoplastic, where the image may be infused through the dye sublimation process. The combination of the printed sheet 218 and the substrate 224 may be loaded onto a bed 214 at the loading zone 204. In some embodiments, the bed 214 may be formed by a graphite honeycomb structure. The bed 214 may be configured as a conveyer belt that moves through the loading zone 204, the heating zone 206, and the cooling zone 208.

The heating zone 206 may include heating elements 210. The heating elements 210 may include heating coils. The heating elements 210 may be electrically heated providing a radiative type heating to the combination of the printed sheet 218 and the substrate 224. For example, the heating elements 210 may be included in multiple electrical heaters, each heating a portion of the combined printed sheet 218 and substrate 224. The heating elements 210 may be housed within individual heaters that may be individually controlled by one or more controllers. The heating elements 210 may also be divided into a plurality of zones, each zone containing one or more heaters. Therefore, a corresponding controller may individually control the heat output of each zone to maintain a consistent temperature at the bed 214 within the heating zone 206. Within the heating zone 206, a membrane 216 may cover the combination of the printed sheet 218 and the substrate 224. The membrane 216 may be formed by a material that may withstand the heat for repeated heating cycles in the heating zone 206. A vacuum pump 222 may pull down the membrane 216 such that the membrane 216 may cover the combination of the printed sheet 218 and the substrate 224.

The heating zone 206 may further contain a pressure housing 220 (also referred to as a pressure box), which can be a structure that encloses or substantially encloses the membrane 216 on the printed sheet 218 and substrate 224. The pressure housing 220 is configured to provide a positive pressure on the membrane 216 as an alternative or in addition to a negative pressure between the membrane 216 and the printed sheet 218 provided by the vacuum pump 222. The positive pressure provided by the pressure housing 220 may be even and consistent throughout the surface of the membrane 216 such that printed sheet 218 and the substrate 224 remain pressed against each other during a heating cycle. The positive pressure may be provided by air pressure generated within the pressure housing 220 or by a mechanical actuator in the pressure housing 220. For example, a compressor (not shown) may pump in pressurized air into the pressure housing 220 thereby increasing the pressure inside the pressure housing 220, which may then push the membrane 216 downward for the membrane to exert pressure on the combination of the printed sheet 218 and the substrate 224. A processor and/or a controller may control the pressure generated by the pressure housing 220, for example, by regulating the flow of pressurized air into the pressure housing 220.

The cooling zone 208 may cool down the combination of the printed sheet 218 and the substrate 224 after the dye sublimation process in the heating zone 206. The cooling zone 208 may include cooling elements 212 such as cold air blowers to expedite the cooling down process. However, it should be understood that the cooling zone 208 may not necessarily include the cooling elements 212 and the substrate 224 may cool down to ambient temperature without the aid of the cooling elements 212. A processor/controller attached to the cooling elements 212 may control the cooling elements based upon the temperature measurement by a temperature sensor (not shown) in the cooling zone 208. It should also be understood that the loading zone 204 and the cooling zone 208 may be combined in some embodiments. In these embodiments, the combination of the printed sheet 218 and the substrate 224 may be placed on the combined zone providing both loading and cooling functionality, be moved to the heating zone 206, and moved back to the combined zone for cooling. Therefore, it should generally be understood that the configuration of FIG. 2 is merely illustrative and alternative configurations should also be considered within the scope of this disclosure.

In an illustrative operation, a worker may place the substrate 224 on the loading zone 204 and place the printed sheet 218 directly on the substrate 224. The bed 214 may be configured as a conveyer belt, which may move the combination of the printed sheet 218 and the substrate 224 to the heating zone 206. The heating zone 206 may be a covered area within the dye sublimation machine 200. Within the heating zone 206, the vacuum pump 222 may pull a vacuum between the membrane 216 and the bed 214 such that the membrane 216 presses down on the printed sheet 218. Furthermore, the pressure housing 220 may provide a positive pressure to the membrane 216 in addition to or as an alternate to the negative pressure between the membrane 216 and the printed sheet 218. The heating elements 210 may generate a requisite amount heat to sublimate the ink on the printed sheet 218. The sublimated ink may then be deposited into the substrate 224. After the combination of the printed sheet 218 and the substrate 224 are left in the heating zone 206 for a requisite amount of time (e.g., based upon the properties of the substrate 224), the combination of the printed sheet 218 and the substrate 224 is moved to the cooling zone. As described above, the loading zone 204 may also function as the cooling zone 208. The cooling process in the cooling zone 208 may be expedited by the cooling elements 212, which may provide an active source of cooling such as a flow of cold air. After the combination of the printed sheet 218 and the substrate 224 is sufficiently cooled, the combination is removed from the dye sublimation machine 200. After this process, the image in the printed sheet 218 may be infused (or deposited) into the substrate 224.

Figure 3:
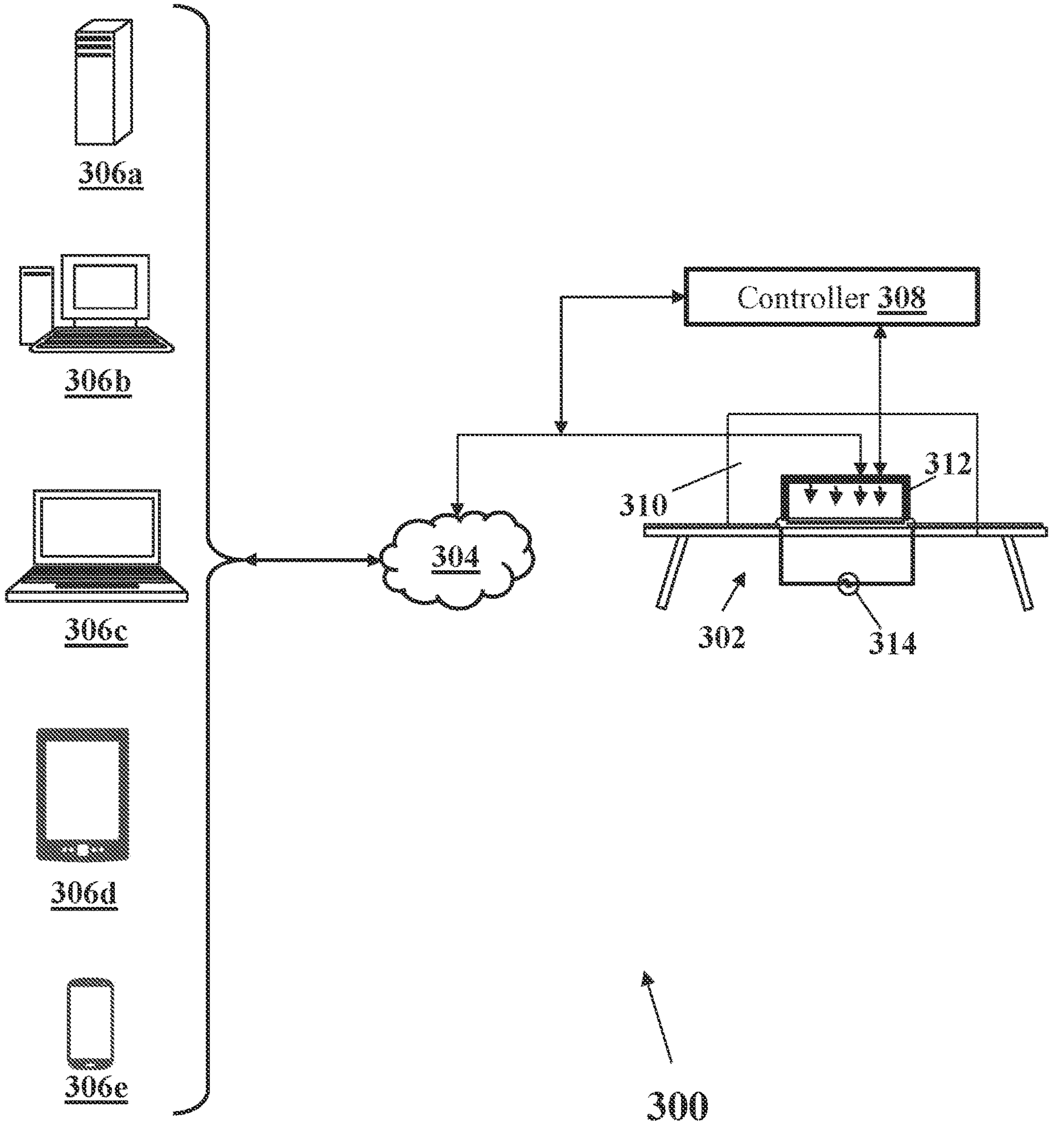
FIG. 3 shows a system for dye sublimation, according to an embodiment.

FIG. 3 shows an illustrative system 300 for dye sublimation, according to an embodiment. As shown, the system 300 may comprise a dye sublimation apparatus (also referred to as a dye sublimation machine) 302, a network 304, computing devices 306*a*, 306*b*, 306*c*, 306*d*, 306*e* (collectively or commonly referred to as 306), and a controller 308. It should be understood that the system 300 and the aforementioned components are merely for illustration and systems with additional, alternative, and a fewer number of components should be considered within the scope of this disclosure.

The dye sublimation apparatus 302 may be a combination of components that may infuse (or dye sublimate) an image from a printed sheet to a substrate. The image may be printed using sublimation inks containing sublimation dyes that may transform from solid state to gaseous state when heated to a predetermined temperature. The sublimation dyes may travel to the substrate and deposit thereon thereby creating an infused image within the substrate. For the heating part of the dye sublimation process, the dye sublimation apparatus 302 may include a heating section (also referred to as heating zone) 310. The heating section may generally be enclosed for temperature control and to preempt the heat escaping the dye sublimation apparatus 302. The heating section 310 may include a bank of heaters (not shown), which may be organized into different zones with each zone containing one or more heaters. The heating section 310 may further include a pressure housing 312 to provide a positive pressure on a membrane covering a printed sheet and a substrate in addition to or as an alternative to a negative pressure between the membrane and the printed sheet provided by a vacuum pump 314.

The pressure housing 312 may be controlled by a controller 308. The single controller 308 is shown merely for illustration and there may be a plurality of controllers 308 controlling the pressure housing 312. More particularly, the controller 308 may regulate the pressure generated by the pressure housing 312. For example, the controller 308 may control an air compressor (not shown) that may pump in compressed air to the pressure housing 312 to regulate the pressure exerted by the pressure housing 312. However, it should be understood that the use of compressed air to control the pressure exerted by the pressure housing 312 is merely for illustration and should not be considered limiting. Other suitable mechanisms that may regulate the pressure exerted by the pressure housing 312 should be considered within the scope of this disclosure.

In addition to the controller 308, the pressure housing 312 may be controlled based upon instructions provided by a computing device 306. For example, the computing device 306 may include an interface for a user to enter a desired amount of positive pressure in the heating section 310 for a particular image and the computing device 306 may provide instructions to the pressure housing 312 through the network 304 to maintain the pressure. Alternatively or additionally, the computing device 306 may provide the instruction to maintain the pressure to the controller 308. In some embodiments, the computing device 306 may provide instructions to the pressure housing 312 to maintain a first pressure at a first stage of the dye sublimation process and to maintain a second pressure at a second stage of the dye sublimation process. It should be understood that the instructions to maintain the pressure and the process of maintaining the pressure may be implemented either in hardware, e.g., through the controller 308, or as a combination of hardware and software, e.g., through one or more applications in the computing device 306, the controller 308, and/or other hardware components in the dye sublimation apparatus. In some embodiments, the controller 308 may cause the pressure housing 312 to gradually ramp up the generated positive pressure. For example, the dye sublimation process may require a gradual ramping up of the positive pressure and therefore a gradual increment may allow the positive pressure to build up to a desired level. It should however be understood that these are just a few illustrations of control of the pressure housing 312 by the computing devices 306 and/or the controller and should not be considered limiting. Other controls causing the pressure housing 312 to statically maintain a positive pressure or dynamically modify positive pressure should be considered within the scope of this disclosure.

The computing devices 306 may include a processor-based device that may execute one or more instructions (e.g., instructions to cause a uniform temperature distribution in the heating section 310) to the dye sublimation apparatus 302 through the network 304. Non-limiting examples of the computing devices 306 include a server 306*a*, a desktop computer 306*b*, a laptop computer 306*c*, a tablet computer 306*d*, and a smartphone 306*e*. However, it should be understood that the aforementioned devices are merely illustrative and other computing devices should also be considered within the scope of this disclosure. At minimum, each computing device 306 may include a processor and non-transitory storage medium that is electrically connected to the processor. The non-transitory storage medium may store a plurality of computer program instructions (e.g., operating system, applications) and the processor may execute the plurality of computer program instructions to implement the functionality of the computing device 306.

The network 304 may be a local or remote network that may provide a communication medium between the computing devices 306 and the dye sublimation apparatus 302. For example, the network 304 may be a local area network (LAN), a desk area network (DAN), a metropolitan area network (MAN), or a wide area network (WAN). However, it should be understood that aforementioned types of networks are merely illustrative and any type of component providing the communication medium between the computing devices 306 and the dye sublimation apparatus 302 should be considered within the scope of this disclosure. For example, the network 304 may be a single wired connection between a computing device 306 and the dye sublimation apparatus 302.

Figure 4:
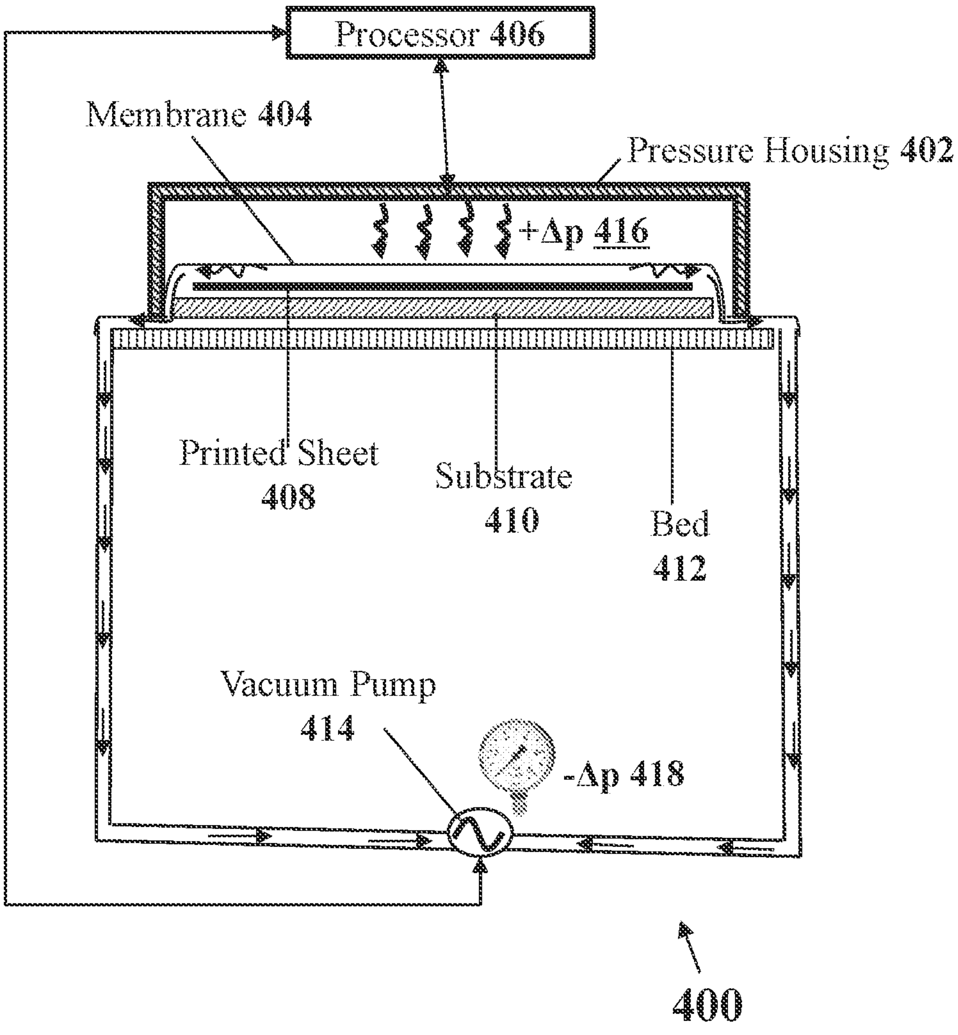
FIG. 4 shows a heating section of a dye sublimation apparatus, according to an embodiment.

FIG. 4 shows an illustrative heating section (also referred to as heating zone or heating component) 400 of a dye sublimation apparatus, according to an embodiment. It should be understood that the components of the heating section 400 shown in FIG. 4 and described herein are merely illustrative and additional, alternative, and fewer number of components should also be considered within the scope of this disclosure. As shown, the heating section 400 may include a pressure housing 402 generating a positive pressure 416 and a vacuum pump 414 generating a negative pressure 418. A processor 406 (to be generally read to include both microprocessors and controllers) may control one or more of the positive pressure 416 generated by the pressure housing 402 or the negative pressure 418 generated by the vacuum pump 414. One or more of the positive pressure 416 generated by the pressure housing 402 or the negative pressure 418 generated by the vacuum pump 414 may cause a membrane 404 to press down on a printed sheet 408 such that the printed sheet 408 and the substrate 410 are snugly pressed against each other. In other words, one or more of the positive pressure 416 and the negative pressure 418 may apply a consistent and an even pressure on top of the printed sheet 408 such that the printed sheet 408 and the substrate 410 stay aligned throughout a heating cycle.

The pressure housing 402 generates the positive pressure 416. In an embodiment, the pressure housing 402 includes hollow structures therein that may receive and hold compressed air. An air compressor (not shown) provides the compressed air to the pressure housing 402 to increase the pressure inside the pressure hosing, which in turn generates the positive pressure 416. Alternatively, the bottom portion of the pressure housing 402 may contain an elastic material (e.g., rubber) that may expand when the compressed air is forced into the pressure housing 402. In this case, the expansion of the elastic material generates the positive pressure 416. The processor 406 controls the air compressor forcing the air into the pressure housing 402 to increase the pressure inside or expand its bottom portion based one or more inputs from a user and/or other environmental variables. In an embodiment, the pressure housing 402 uses a liquid medium to generate the positive pressure 416. The liquid medium (e.g., water, oil) may flow into the pressure housing 402 to increase pressure inside of the pressure housing 402 and/or to cause the bottom portion of the pressure housing 402 to expand thereby causing the positive pressure 416. The processor 406 controls the flow of the liquid based upon inputs from the user and/or other environmental variables.

The air and/or the liquid for generating the positive pressure 416 may be heated for the pressure housing 402 to function as an additional heat source within the heating section 400 of the dye sublimation apparatus. For example, the pressure housing 402 may include heating coils that the processor 406 controls, and, depending upon the heat desired for a heating cycle and the heat generated by the heater banks, the processor 406 may cause the heating coils to heat the fluid (e.g., air or another type of liquid) in the pressure housing. In other instances, the incoming fluid to the pressure housing 402 is already heated and the pressure housing 402 may not have the coils to heat the fluid. In some embodiments, the structure of the pressure housing 402 is heated thereby providing heat in addition to the heat generated by the heater banks.

The processor 406 may also mechanically regulate the weight of the pressure housing 402 and therefore the positive pressure 416 generated by the pressure housing 402. For instance, the processor 406 may actuate one or more motors to drive the pressure housing 402 downwards thereby increasing the weight of the pressure housing 402. The one or more motors may also control the position of the pressure housing 402, e.g., by lowering the pressure housing 402 to the membrane 404 or lifting up the pressure housing 402 from the membrane 404. As another example, the processor 406 may shift one or more weight pieces from the frame of the dye sublimation apparatus to the pressure housing 402 to increase the weight of the pressure housing 402.

It should however be understood that the aforementioned mechanisms for generating the positive pressure 416 using the pressure housing 402 are for illustrative purposes only and should not be considered limiting. Other mechanical, electromechanical, and/or chemical process for generating the positive pressure 416 should be considered within the scope of this disclosure. It should further be understood that the pressure housing 402 may move (e.g., horizontally) with the membrane 404, the printed sheet 408, and the substrate 410 along with a bed 412 (e.g., a conveyor belt) within the heating section 400.

In addition to the pressure housing 402 generating the positive pressure 416, the heating section 400 may also include a vacuum pump 414 generating a negative pressure 418. The negative pressure 418 may be in between the membrane 404 and the printed sheet 408. More particularly, the vacuum pump 414 may pull in the air in between the membrane 404 and the printed sheet 408 thereby generating the negative pressure 418. The processor 406 may control the vacuum pump 414 to regulate the negative pressure 418 in between the membrane 404 and the printed sheet 408.

In some embodiments, the processor 406 regulates the positive pressure 416 and/or the negative pressure 418 such that the pressure within the heating section 400 may remain constant or nearly constant throughout a heating cycle. In other embodiments, the processor 406 regulates the positive pressure 416 and the negative pressure 418 such that the pressure within the heating section 400 is varied during the heating cycle. A variable pressure may be desired when different phases of the heating cycle may require different pressure levels. For example, during the initial phases of the heating cycle, the heating section 400 may not require a moderate amount of pressure and during the later phases, the heating section 400 may require a higher amount of pressure. More generally, a user by programming the processor 406, may flexibly regulate the pressure within the heating section 400 during the dye sublimation process.

Figure 5:
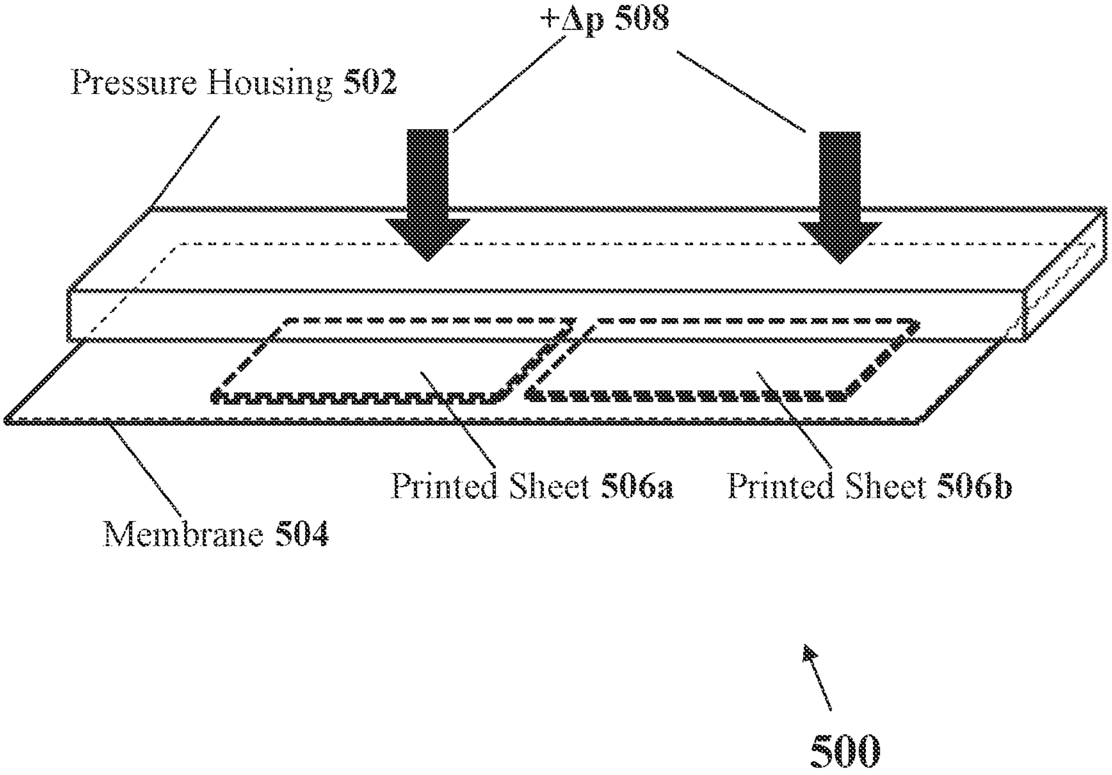
FIG. 5 shows a perspective view of a heating component of a dye sublimation apparatus, according to an embodiment.

FIG. 5 shows a perspective view of an illustrative heating section 500 of a dye sublimation apparatus, according to an embodiment. As shown, the heating section may include a pressure housing 502 that may apply a positive pressure 508 on a membrane 504. A processor (not shown) may regulate the positive pressure 508 provided by the pressure housing 502. For example, the processor may control one or more mechanical actuators, flow of a fluid into the pressure housing 502, and/or other mechanical, electromechanical, or chemical processes within the pressure housing 502 such that the pressure housing 502 generates a desired amount of positive pressure 508. The processor may control the pressure housing 502 based upon feedback received from one or more sensors (e.g., a temperature or pressure sensor), instructions from a software, and/or manual inputs provided by a user. The positive pressure 508 may cause the membrane 504 to apply an even and a consistent pressure on printed sheets **506*a*, 506*b* such that the printed sheets 506*a*, 506*b* are snugly pressed against corresponding substrates (not shown). Such snugly pressed contacts between the printed sheets 506*a*, 506*b*** and the corresponding substrates may allow for the dye sublimation apparatus to generate a consistent quality image into the substrate.

Figure 6:
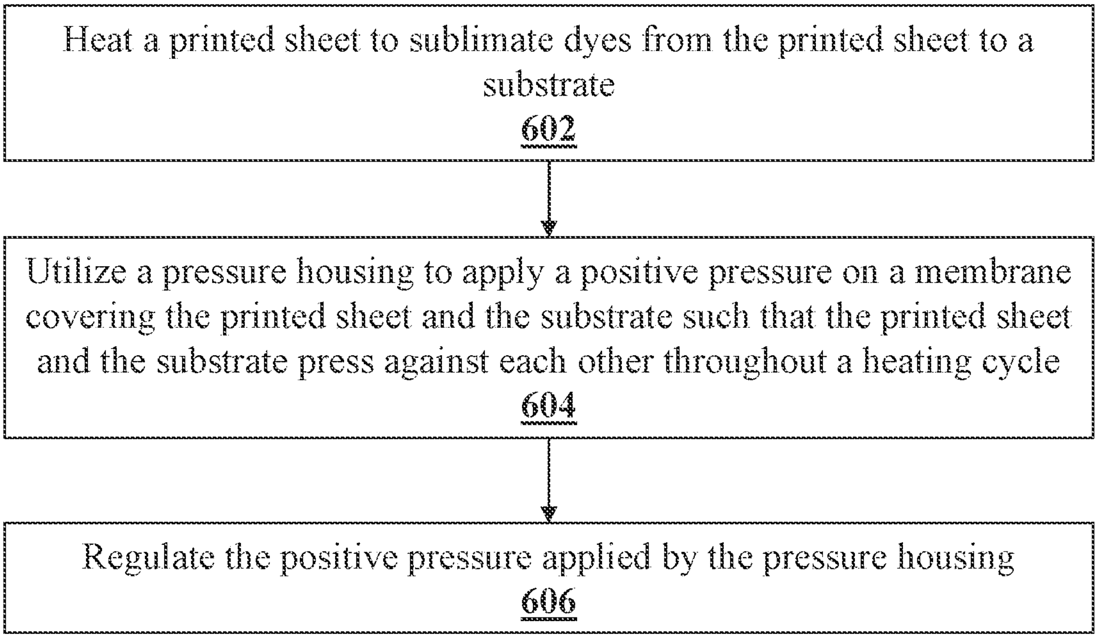
FIG. 6 shows a flow diagram of a method for dye sublimation, according to an embodiment.

FIG. 6 shows a flow diagram of an illustrative method 600 for dye sublimation, according to an embodiment. The steps of the method 600 described herein are merely illustrative and methods with alternative, additional, and fewer number of steps should also be considered within the scope of this disclosure.

The method may begin at step 602 where a heating section of a dye sublimation apparatus heats a printed sheet within the heating section to sublimate dyes from the printed sheet to a substrate. The heating section may include heater banks to generate the requisite amount of heat for the dyes to sublimate into gaseous state.

At step 604, a pressure housing may apply a positive pressure on a membrane covering the printed sheet and the substrate. The pressure housing may include a mechanical, electromechanical, and/or chemical mechanism to generate and apply the positive pressure. The positive pressure on the membrane may cause the printed sheet and the substrate to press against each other throughout a heating cycle. The close contact caused by the applied pressure may better facilitate the flow of the sublimed dyes into the substrate. Furthermore, the pressure may be even and consistent throughout the surface of the printed sheet, and therefore the quality of infused image in the substrate may be uniform throughout the image.

At step 606, a processor may regulate the positive pressure applied by the pressure housing. In some embodiments, the processor maintains a constant pressure throughout the heating cycle. In other embodiments, the processor dynamically changes the pressure in the pressure housing as the heating cycle progresses. For example, initial stages of the heating cycle may require moderate pressure and later stages of the heating cycle may require a larger pressure. The processor may regulate the positive pressure by regulating the mechanical, electromechanical, and/or chemical mechanism of generating the pressure in the pressure housing. The processor may also control the pressure within the heating section by regulating a vacuum pump that generates a negative pressure within the heating section.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A dye sublimation apparatus for infusing an image on a printed sheet to a substrate, the dye sublimation apparatus comprising:

at least one heater configured to heat the printed sheet to sublimate one or more dyes forming the image, such that the one or more dyes travel to the substrate in a gaseous state and deposit into the substrate in a solid state to infuse the image into the substrate;

a membrane configured to cover the printed sheet and the substrate;

a pressure housing configured to apply a positive pressure to the membrane such that the printed sheet and the substrate press against each other throughout a heating cycle, wherein the positive pressure is generated by an expansion of a bottom portion of the pressure housing; and a processor configured to transmit control instructions to the pressure housing to control the positive pressure applied by the pressure housing, wherein the processor is further configured to transmit the control instructions to cause the pressure housing to dynamically change the positive pressure during the heating cycle.

2. The dye sublimation apparatus of claim 1, further comprising:

a vacuum pump configured to apply a negative pressure between the membrane and the printed sheet.

3. The dye sublimation apparatus of claim 2, further comprising:

a processor configured to transmit control instructions control instructions to the vacuum pump to control the negative pressure applied by the vacuum pump.

4. The dye sublimation apparatus of claim 1, wherein the positive pressure is generated by a fluid medium entering the pressure housing.

5. The dye sublimation apparatus of claim 1, wherein the positive pressure is generated by a mechanical actuator.

6. The dye sublimation apparatus of claim 5, wherein the mechanical actuator is configured to lift up and push down the pressure housing.

7. The dye sublimation apparatus of claim 1, wherein the bottom portion of the pressure housing comprises an elastic material.

8. A dye sublimation method for infusing an image on a printed sheet to a substrate, the method comprising:

heating, by at least one heater of a dye sublimation apparatus, the printed sheet to sublimate one or more dyes forming the image such that the one or more dyes travel to the substrate in a gaseous state and deposit on the substrate in a solid state to infuse the image into the substrate;

applying, by a pressure housing of the dye sublimation apparatus, a positive pressure to a membrane configured to cover the printed sheet and the substrate, such that the printed sheet and the substrate press against each other throughout a heating cycle, wherein the positive pressure is generated by an expansion of a bottom portion of the pressure housing;

regulating, by a processor of the dye sublimation apparatus, the positive pressure applied by the pressure housing;

transmitting, by the processor, control instructions to the pressure housing to regulate the positive pressure applied by the pressure housing; and transmitting, by the processor, the control instructions to cause the pressure housing to dynamically change the positive pressure during the heating cycle.

9. The dye sublimation method of claim 8, further comprising:

applying, by a vacuum pump of the dye sublimation apparatus, a negative pressure between the membrane and the printed sheet.

10. The dye sublimation method of claim 9, further comprising:

transmitting, by the processor, control instructions to the vacuum pump to regulate the negative pressure applied by the vacuum pump.

11. The dye sublimation method of claim 8, wherein the positive pressure is generated by a fluid medium entering the pressure housing.

12. The dye sublimation method of claim 8, wherein the positive pressure is generated by a mechanical actuator.

13. The dye sublimation method of claim 12, further comprising:

repositioning, by the mechanical actuator, the pressure housing.

* * * * *